(12) United States Patent
Hamada et al.

(10) Patent No.: US 10,903,513 B2
(45) Date of Patent: Jan. 26, 2021

(54) FUEL CELL DEVICE AND VEHICLE WITH THE SAME MOUNTED THEREON

(71) Applicant: TOYOTA JIDOSHA KABUSHIKI KAISHA, Toyota (JP)

(72) Inventors: Hitoshi Hamada, Gotenba (JP); Hideyuki Kanazawa, Toyota (JP); Terufumi Kobayashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 193 days.

(21) Appl. No.: 16/279,008

(22) Filed: Feb. 19, 2019

(65) Prior Publication Data
US 2019/0260061 A1 Aug. 22, 2019

(30) Foreign Application Priority Data
Feb. 20, 2018 (JP) .................... 2018-028021

(51) Int. Cl.
*H01M 8/2475* (2016.01)
*B60L 50/72* (2019.01)
*B60L 50/71* (2019.01)

(52) U.S. Cl.
CPC .......... *H01M 8/2475* (2013.01); *B60L 50/71* (2019.02); *B60L 50/72* (2019.02); *B60Y 2200/91* (2013.01); *B60Y 2400/202* (2013.01); *H01M 2250/20* (2013.01)

(58) Field of Classification Search
CPC ................ B60Y 2200/91; B60L 50/72; H01M 2250/20; H01M 8/2475
See application file for complete search history.

(56) References Cited

U.S. PATENT DOCUMENTS

2016/0190632 A1* 6/2016 Itoga ..................... H01M 8/248
429/467

FOREIGN PATENT DOCUMENTS

| JP | 2002-367663 | 12/2002 |
|---|---|---|
| JP | 2006-040752 | 2/2006 |

* cited by examiner

*Primary Examiner* — Cynthia H Kelly
*Assistant Examiner* — Monique M Wills
(74) *Attorney, Agent, or Firm* — Finnegan, Henderson, Farabow, Garrett & Dunner, LLP

(57) ABSTRACT

A fuel cell device that can prevent exposure of a cell stack to the outside of a stack case, and a vehicle with the same mounted thereon. The fuel cell device includes a cell stack, end plates disposed at opposite ends of the cell stack in a stacking direction of fuel cells, and a stack case housing the cell stack and end plates. The stack case has a bottom surface portion, end plate facing portions facing the respective end plates, side surface portions extending in the stacking direction, and mount portions disposed near corner portions between the respective side surface portions and end plate facing portions and on outer walls of the respective side surface portions such that the mount portions are positioned in a pair across the bottom surface portion. The bottom surface portion has rib portions disposed thereon that each extends between a pair of the mount portions.

3 Claims, 4 Drawing Sheets

FUEL CELL DEVICE AND VEHICLE WITH THE SAME MOUNTED THEREON

CROSS REFERENCE TO RELATED APPLICATIONS

The present application claims priority from Japanese patent application JP 2018-028021 filed on Feb. 20, 2018, the content of which is hereby incorporated by reference into this application.

BACKGROUND

Technical Field

The present disclosure relates to a fuel cell device and a vehicle with the fuel cell device mounted thereon.

Conventional techniques in this field include the one described in JP 2002-367663 A. A fuel cell device described in JP 2002-367663 A is mounted on a vehicle and includes a cell stack formed by stacking a plurality of fuel cells, an end plate disposed at an end of the cell stack in the stacking direction of the fuel cells, and a stack case that houses the cell stack and the end plate.

Background Art

However, such a fuel cell device may occasionally be subjected to an external shock, and due to such a shock, the cell stack may be exposed to the outside of the stack case. Therefore, prevention of such exposure of the cell stack to the outside of the stack case is required.

The present disclosure has been made so as to solve the aforementioned technical problem, and provides a fuel cell device that can prevent exposure of a cell stack to the outside of a stack case and a vehicle with the fuel cell device mounted thereon.

SUMMARY

The fuel cell device according to the present disclosure includes a cell stack formed by stacking a plurality of fuel cells, a pair of end plates disposed at opposite ends of the cell stack in a stacking direction of the fuel cells, and a stack case that houses the cell stack and the pair of end plates, the stack case including a bottom surface portion, a pair of end plate facing portions that face the respective end plates and that have a higher rigidity than the bottom surface portion, a pair of side surface portions that extend in the stacking direction of the fuel cells of the cell stack, and two pairs of mount portions, each pair being disposed near corner portions between the respective side surface portions and the one of the pair of end plate facing portions and on the outer walls of the respective side surface portions such that the mount portions in each pair are positioned across the bottom surface portion, in which the two pairs of mount portions are formed so as to couple the pair of side surface portions to the respective end plate facing portions, and the bottom surface portion has disposed thereon rib portions that project downward and that are each positioned at a distance from adjacent one of the pair of end plate facing portions in the stacking direction of the fuel cells of the cell stack such that the rib portions extend between the pair of mount portions that are positioned across the bottom surface portion.

In the fuel cell device according to the present disclosure, since the rib portions are each disposed on the bottom surface portion at a distance from the adjacent one of the pair of end plate facing portions such that the rib portions extend between the pair of mount portions that are positioned across the bottom surface portion, portions of the bottom surface portion between the respective rib portions and their adjacent end plate facing portions have a relatively lower rigidity than the portions where the rib portions are disposed. Further, since the rigidity of the end plate facing portions is higher than that of the bottom surface portion, even if a shock is exerted on the stack case from the side of one of the end plate facing portions, the portion of the bottom surface portion between the rib portion and its adjacent end plate facing portion ruptures so that the shock is absorbed and breaking of the stack case can be prevented. In addition, since the mount portions are formed so as to couple the side surface portions to the respective end plate facing portions, the side surface portions and the end plate facing portions are coupled together via the mount portions so that detachment of the end plate facing portions when the stack case becomes damaged can be prevented. As a result, the exposure of the cell stack to the outside of the stack case can be prevented.

A fuel cell vehicle according to the present disclosure has mounted thereon the aforementioned fuel cell device, and the fuel cells of the cell stack are stacked in a direction corresponding to the front-rear direction of the vehicle. With such a configuration, even if a shock is exerted on the vehicle in the front-rear direction, the exposure of the cell stack to the outside of the stack case can be prevented.

A fuel cell vehicle according to the present disclosure has mounted thereon the aforementioned fuel cell device, and the fuel cells of the cell stack are stacked in a direction corresponding to the width direction of the vehicle. With such a configuration, even if a shock is exerted on the vehicle in the width direction, the exposure of the cell stack to the outside of the stack case can be prevented.

According to the present disclosure, the exposure of the cell stack to the outside of the stack case can be prevented.

DETAILED DESCRIPTION

An embodiment of a fuel cell device and a vehicle with the fuel cell device mounted thereon according to the present disclosure will be described below with reference to the drawings, but the fuel cell device according to the present disclosure is also applicable to vessels, aircrafts, trains, and power generation facilities for buildings as well as vehicles.

<Fuel Cell Device>

Figure 1:
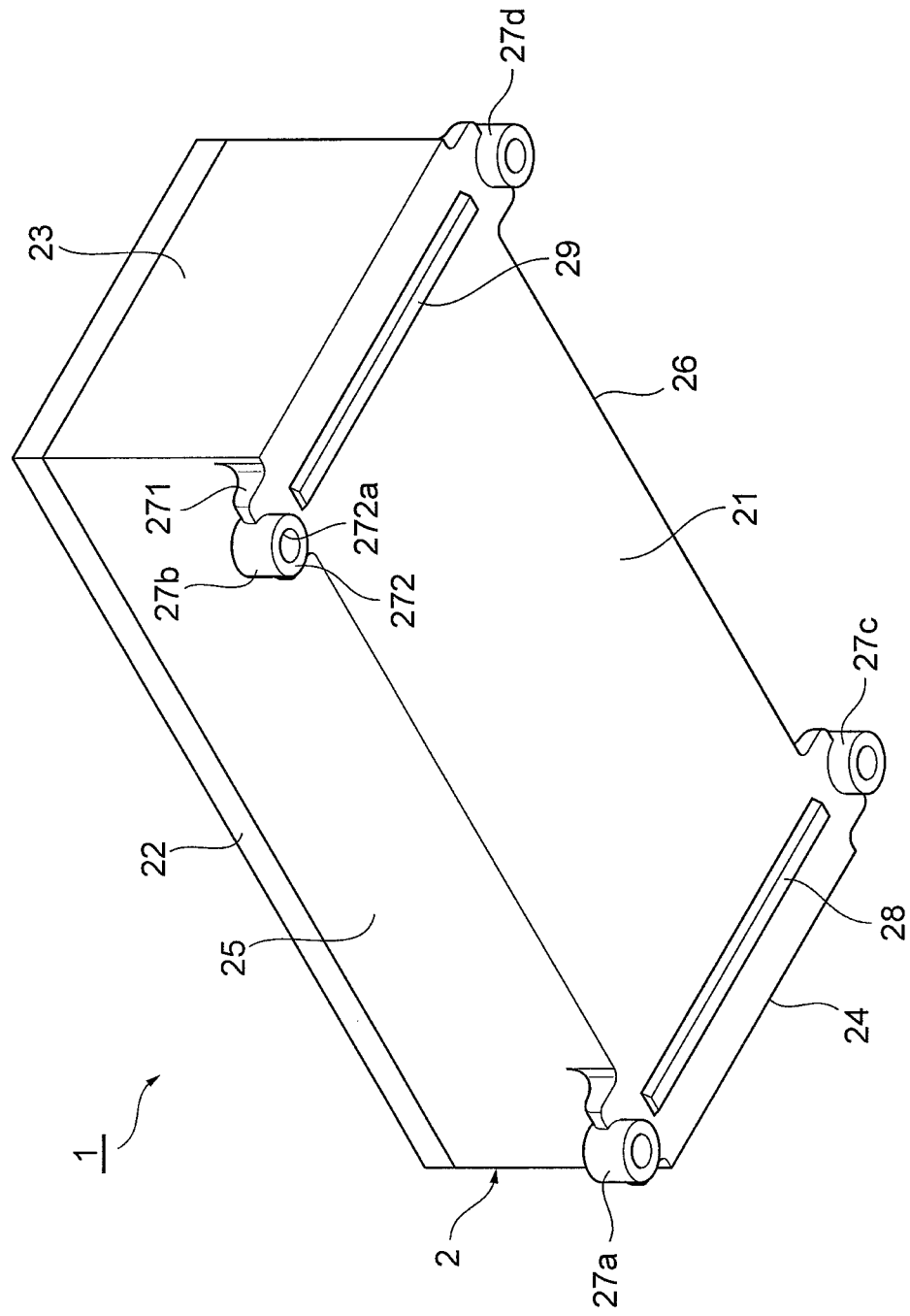
FIG. 1 is a perspective view of a fuel cell device according to an embodiment.
Figure 2:
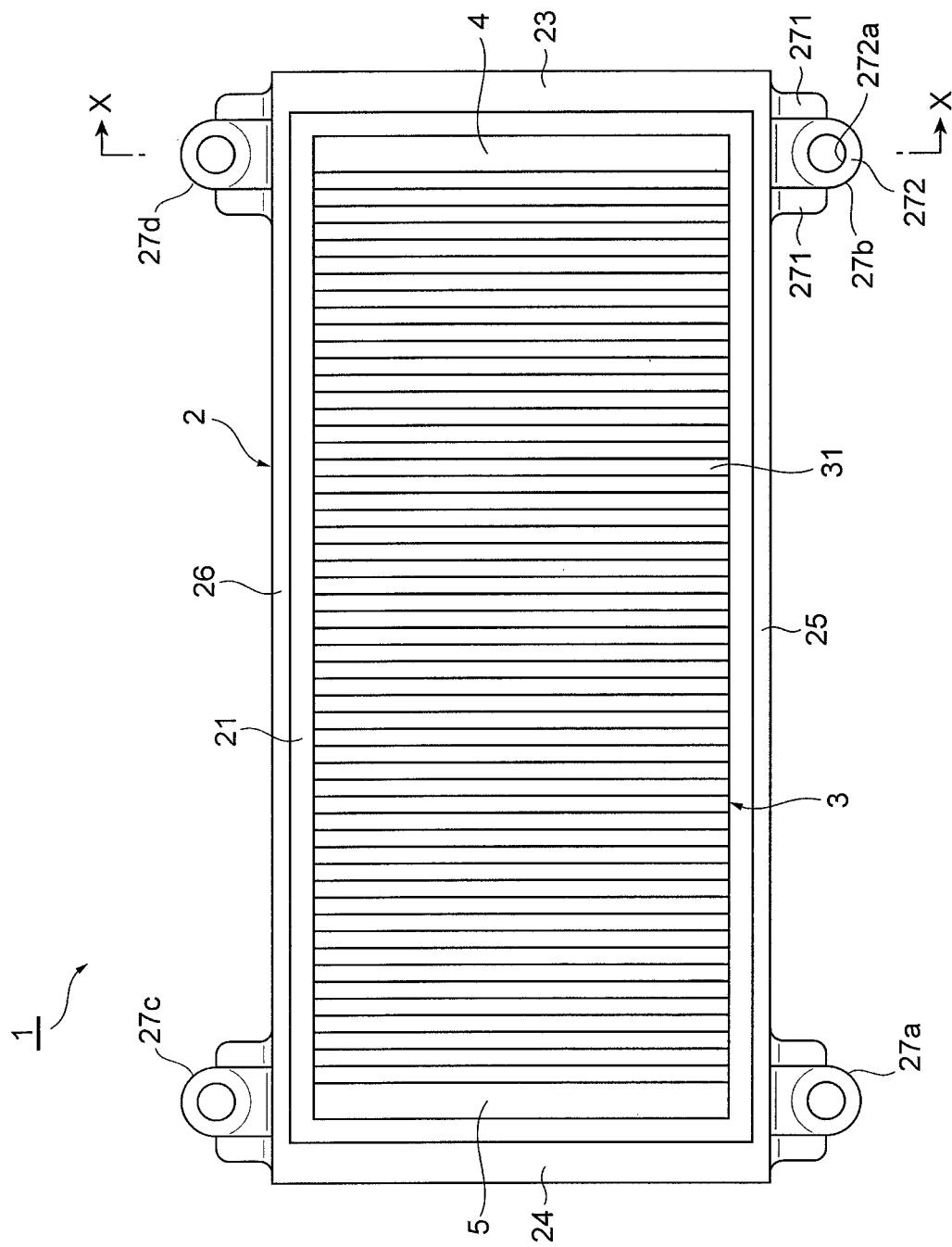
FIG. 2 is a plan view of the fuel cell device according to the embodiment.
Figure 3:
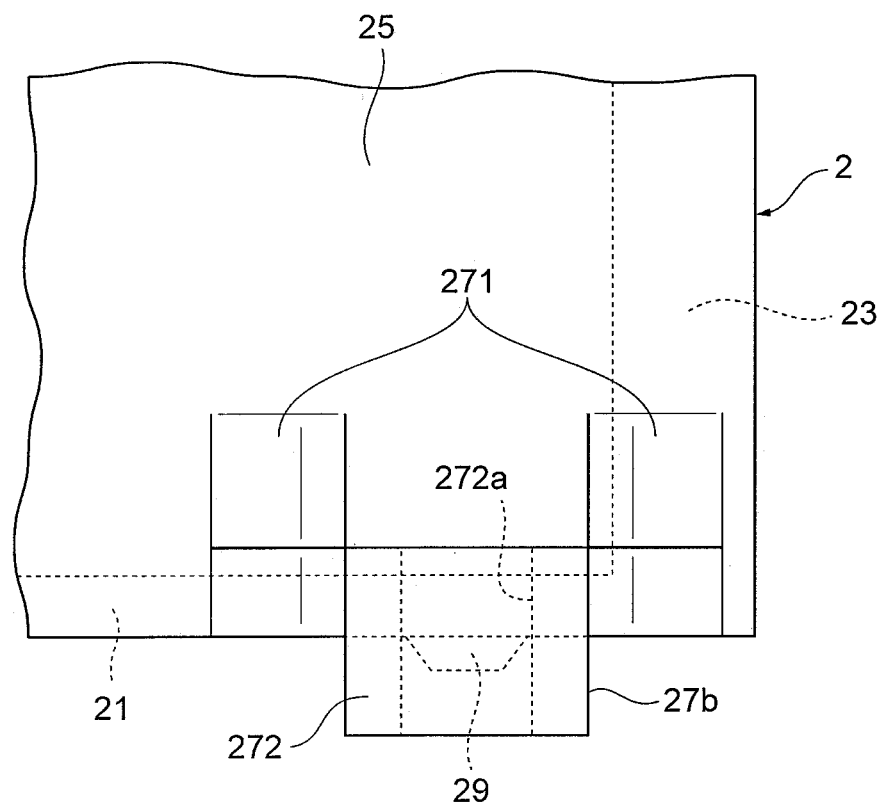
FIG. 3 is an enlarged side view of a mount portion.
Figure 4:
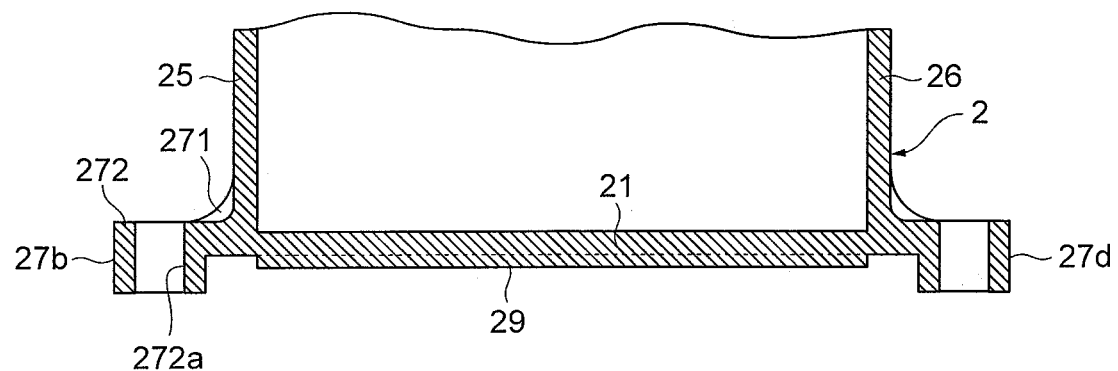
FIG. 4 is a cross-sectional view taken along line X-X of FIG. 2.

FIG. 1 is a perspective view of a fuel cell device according to an embodiment; FIG. 2 is a plan view of the fuel cell device according to the embodiment; FIG. 3 is an enlarged side view of a mount portion; and FIG. 4 is a cross-sectional view taken along line X-X of FIG. 2. It should be noted that in FIG. 2, a top surface portion of a stack case is not shown for easy understanding of the structure of a cell stack that is housed in the stack case or the like.

A fuel cell device 1 of the present embodiment is mounted in a front compartment of a vehicle as a drive source, for example, and mainly includes a cell stack 3 in which a plurality of fuel cells 31 are stacked, a pair of end plates 4 and 5 that are disposed at the opposite ends of the cell stack 3 in the stacking direction of the fuel cells 31, and a stack case 2 that houses the cell stack 3 and the pair of end plates 4 and 5.

The cell stack 3 is formed by stacking a plurality of fuel cells 31 and is a polymer electrolyte fuel cell. Each fuel cell 31, for example, includes a membrane electrode assembly (not shown) in which a polymer electrolyte membrane is sandwiched between an anode electrode and a cathode electrode, and a pair of separators (not shown) that sandwich the membrane electrode assembly from the opposite sides thereof. Each fuel cell 31 generates electricity through an electrochemical reaction between an oxygen gas in the air supplied via the separator on the side of the cathode electrode and a hydrogen gas supplied via the separator on the side of the anode electrode. Further, the plurality of fuel cells 31 are securely fastened by the end plates 4 and 5 with a predetermined compressive load.

The stack case 2 is formed in a rectangular box shape with a metal material such as aluminum, and includes a bottom surface portion 21, a top surface portion 22, a pair of end plate facing portions 23 and 24 that face the end plates 4 and 5, respectively, and a pair of side surface portions 25 and 26 that extend in a stacking direction of the fuel cells of the cell stack 3. It should be noted that the outer surfaces of the bottom surface portion 21, the top surface portion 22, the end plate facing portions 23 and 24, and the side surface portions 25 and 26 may be each provided with a lattice reinforcing rib.

In the present embodiment, the rigidity of the end plate facing portions 23 and 24 is higher than that of the bottom surface portion 21. Specifically, each of the end plate facing portions 23 and 24, which are made of the same metal material as that of the bottom surface portion 21, has a plate thickness greater than that of the bottom surface portion 21, that is, each end plate facing portion is thicker than the bottom surface portion 21. It should be noted that herein, the rigidity of the end plate facing portions 23 and 24 and that of the bottom surface portion 21 may be differentiated by adopting a metal material with a relatively high rigidity for the end plate facing portions 23 and 24 and a metal material with a relatively low rigidity for the bottom surface portion 21.

Further, the stack case 2 has two pairs of mount portions 27a to 27d that are adapted to securely attach the stack case 2 to a vehicle body (not shown). As shown in FIG. 2, these two pairs of mount portions 27a to 27d are disposed near corner portions between the side surface portions 25 and 26 and the end plate facing portions 23 and 24 and on the outer walls of the side surface portions 25 and 26 such that the mount portions in each pair are positioned across the bottom surface portion 21.

Specifically, the mount portion 27a and mount portion 27b are disposed on the outer wall of the side surface portion 25 and in positions adjacent to the end plate facing portion 24 and end plate facing portion 23, respectively. Meanwhile, the mount portion 27c and mount portion 27d are disposed on the outer wall of the side surface portion 26 and in positions adjacent to the end plate facing portion 24 and end plate facing portion 23, respectively.

Further, the mount portions 27a and 27c are disposed in a pair on the opposite sides of the bottom surface portion 21 so as to be positioned across it. Meanwhile, the mount portions 27b and 27d are also disposed in a pair on the opposite sides of the bottom surface portion 21 so as to be positioned across it. Since the mount portions 27a to 27d have the same structure, the structure of the mount portion 27b will only be described below.

As shown in FIG. 3, the mount portion 27b has a coupling portion 271 that is adapted to couple the side surface portion 25 to the end plate facing portion 23 that is adjacent to the side surface portion 25, and an attachment portion 272 that is disposed below the coupling portion 271 and is adapted to attach the stack case 2 to the vehicle body. The coupling portion 271 is integrally formed with the side surface portion 25 and the end plate facing portion 23, such that it extends to the end plate facing portion 23 along the side surface portion 25 in the stacking direction of the fuel cells 31.

The attachment portion 272 is provided with a through-hole 272a into which a bolt can be inserted. As shown in FIG. 3, the lower surface of the attachment portion 272 is positioned further below the lower surface of the bottom surface portion 21. The mount portion 27b with such a structure is made of a metal material, such as aluminum, and is integrally formed with the side surface portion 25 and the end plate facing portion 23.

As shown in FIG. 1, the bottom surface portion 21 has a rib portion 28 disposed thereon such that it extends between the mount portions 27a and 27c that are positioned in a pair across the bottom surface portion 21, and a rib portion 29 disposed thereon such that it extends between the mount portions 27b and 27d that are positioned in a pair across the bottom surface portion 21. The rib portions 28 and 29 are formed so as to project downward from the lower surface of the bottom surface portion 21. The lower surfaces of the rib portions 28 and 29 are positioned higher than the lower surface of the attachment portion 272 of the mount portion 27b so that the projecting rib portions 28 and 29 do not affect the attachment of the stack case 2 to the vehicle body (see FIG. 3 and FIG. 4).

Further, the rib portion 28 and the rib portion 29 are disposed at a predetermined distance from the adjacent end plate facing portion 24 and the adjacent end plate facing portion 23, respectively, in the stacking direction of the fuel cells 31.

In the fuel cell device 1 with the aforementioned configuration, since the rib portion 28 is disposed at a predetermined distance from the adjacent end plate facing portion 24 such that it extends between the mount portions 27a and 27c that are positioned in a pair across the bottom surface portion 21, and the rib portion 29 is disposed at a predetermined distance from the adjacent end plate facing portion 23 such that it extends between the mount portions 27b and 27d that are positioned in a pair across the bottom surface portion 21, the portions of the bottom surface portion 21 between the end plate facing portion 23 and the rib portion 29 and between the end plate facing portion 24 and the rib portion 28 have relatively a lower rigidity than the portions where the rib portions 28 and 29 are disposed.

Figure 5:
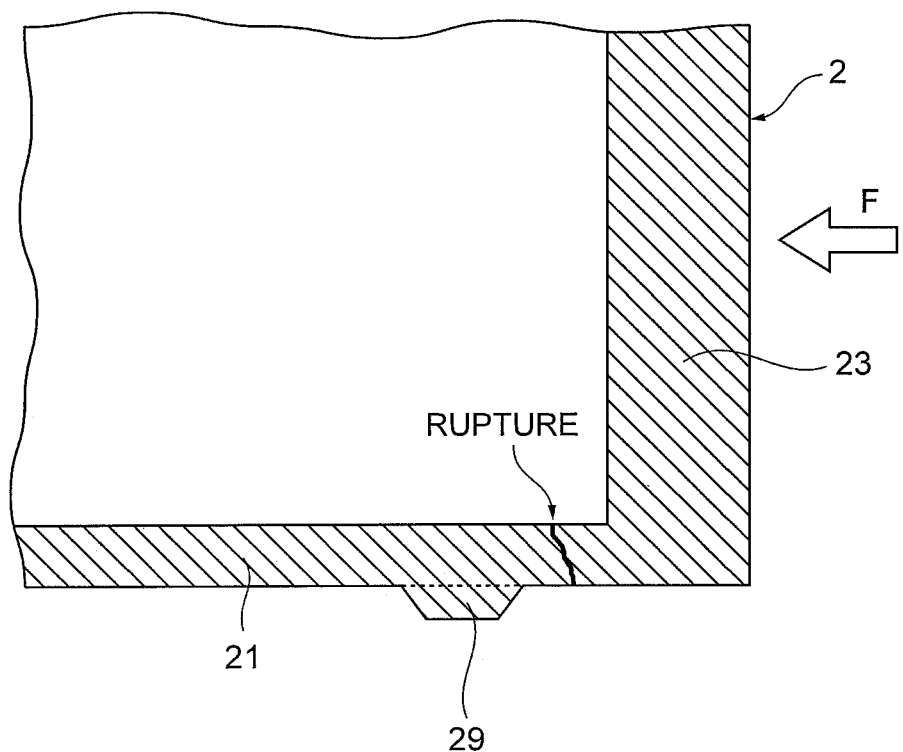
FIG. 5 is a schematic cross-sectional view for illustration of rupture generated when a shock is exerted.

Herein, the end plate facing portion 23, bottom surface portion 21, and rib portion 29 that are shown in FIG. 5 will be described in detail as an example. Specifically, the portion of the bottom surface portion 21 between the end plate facing portion 23 and the rib portion 29 has a relatively lower rigidity than the portion where the rib portion 29 is disposed. Further, as described above, since the rigidity of the end plate facing portion 23 is higher than that of the bottom surface portion 21, even if a shock F is exerted on the stack case from the side of the end plate facing portion 23, for example, the portion of the bottom surface portion 21 between the end plate facing portion 23 and the rib portion 29 ruptures so that the shock is absorbed and breaking of the stack case 2 can be prevented.

Further, the mount portion 27b has the coupling portion 271 that is adapted to couple the side surface portion 25 and the end plate facing portion 23 that is adjacent to the side surface portion 25, and thus, the side surface portion 25 and the end plate facing portion 23 are coupled together via the coupling portion 271 so that detachment of the end plate facing portion 23 when the stack case becomes damaged can be prevented. As a result, the exposure of the cell stack 3 to the outside of the stack case 2 and electrification due to such exposure of the cell stack 3 can be prevented. Likewise, even if a shock is exerted on the stack case from the side of the end plate facing portion 24, the portion of the bottom surface portion 21 between the end plate facing portion 24 and the rib portion 28 ruptures so that breaking of the stack case 2 and the exposure of the cell stack 3 to the outside of the stack case 2 can be prevented.

<Vehicle with Fuel Cell Device>

Figure 6:
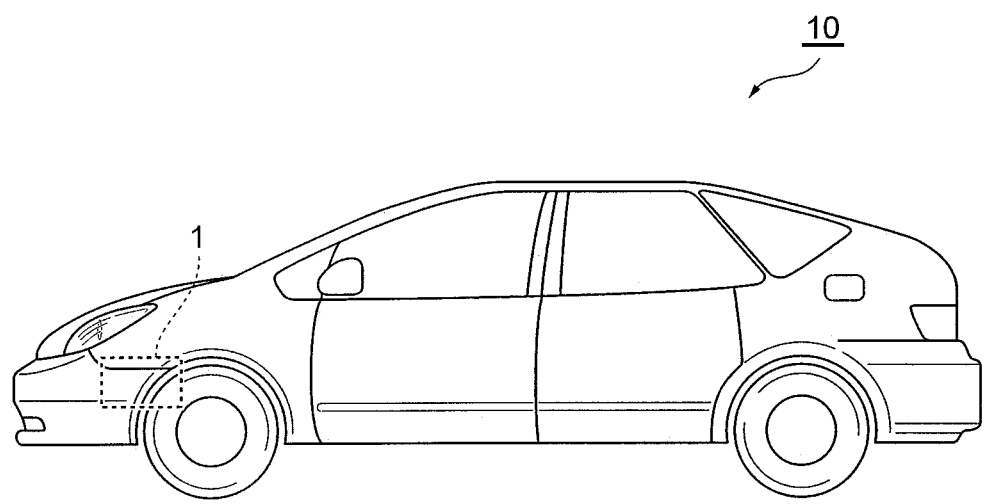
FIG. 6 is a schematic view of a vehicle with the fuel cell device mounted thereon.

FIG. 6 is a schematic view of a vehicle with the fuel cell device mounted thereon. A vehicle 10 of the present embodiment includes the aforementioned fuel cell device 1. The fuel cell device 1 is mounted in the front compartment such that the fuel cells of the cell stack 3 are stacked in a direction corresponding to the front-rear direction of the vehicle. In this case, the end plate facing portions 23 and 24 face the front side and the rear side of the vehicle, respectively.

Since the vehicle 10 with such a configuration includes the fuel cell device 1, even if a shock is exerted on the vehicle in the front-rear direction, the exposure of the cell stack 3 to the outside of the stack case 2 can be prevented.

It should be noted that the fuel cell device 1 may be mounted in the front compartment such that the fuel cells of the cell stack 3 are stacked in a direction corresponding to the width direction of the vehicle. In this case, the end plate facing portions 23 and 24 face the lateral side of the vehicle. With such a configuration, even if a shock is exerted on the vehicle in the width direction of the vehicle, the exposure of the cell stack 3 to the outside of the stack case 2 can be prevented.

Although the embodiment of the present disclosure has been described in detail, the present disclosure is not limited thereto, and various design changes can be made within the spirit and scope of the present disclosure described in the claims.

DESCRIPTION OF SYMBOLS

1 Fuel cell device
2 Stack case
3 Cell stack
4, 5 End plates
10 Vehicle
21 Bottom surface portion
22 Top surface portion
23, 24 End plate facing portions
25, 26 Side surface portions
27a, 27b, 27c, 27d Mount portions
28, 29 Rib portions
31 Fuel cell
271 Coupling portion
272 Attachment portion

What is claimed is:

1. A fuel cell device comprising:
a cell stack formed by stacking a plurality of fuel cells;
a pair of end plates disposed at opposite ends of the cell stack in a stacking direction of the fuel cells; and
a stack case that houses the cell stack and the pair of end plates,
wherein:
the stack case includes
a bottom surface portion,
a pair of end plate facing portions that face the respective end plates and that have a higher rigidity than the bottom surface portion,
a pair of side surface portions that extend in the stacking direction of the fuel cells of the cell stack, and
two pairs of mount portions, each pair being disposed near corner portions between the respective side surface portions and one of the pair of end plate facing portions and on outer walls of the respective side surface portions such that the mount portions in each pair are positioned across the bottom surface portion,
the two pairs of mount portions are formed so as to couple the pair of side surface portions to the respective pair of end plate facing portions, and
the bottom surface portion has disposed thereon rib portions that project downward and that are each positioned at a distance from adjacent one of the pair of end plate facing portions in the stacking direction of the fuel cells of the cell stack such that the rib portions extend between the pair of mount portions that are positioned across the bottom surface portion.

2. A full cell vehicle comprising a fuel cell device mounted thereon, the fuel cell device including a cell stack formed by stacking a plurality of fuel cells, a pair of end plates disposed at opposite ends of the cell stack in a stacking direction of the fuel cells, and a stack case that houses the cell stack and the pair of end plates,
wherein:
the stack case includes
a bottom surface portion,
a pair of end plate facing portions that face the respective end plates and that have a higher rigidity than the bottom surface portion,
a pair of side surface portions that extend in the stacking direction of the fuel cells of the cell stack, and
two pairs of mount portions, each pair being disposed near corner portions between the respective side surface portions and one of the pair of end plate facing portions and on outer walls of the respective side surface portions such that the mount portions in each pair are positioned across the bottom surface portion,
the two pairs of mount portions are formed so as to couple the pair of side surface portions to the respective pair of end plate facing portions,
the bottom surface portion has disposed thereon rib portions that project downward and that are each positioned at a distance from adjacent one of the pair of end plate facing portions in the stacking direction of the fuel cells of the cell stack such that the rib portions extend between the pair of mount portions that are positioned across the bottom surface portion, and
the fuel cells of the cell stack are stacked in a direction corresponding to a front-rear direction of the vehicle.

3. A fuel cell vehicle comprising a fuel cell device mounted thereon, the fuel cell device including a cell stack formed by stacking a plurality of fuel cells, a pair of end plates disposed at opposite ends of the cell stack in a stacking direction of the fuel cells, and a stack case that houses the cell stack and the pair of end plates,
wherein:
the stack case includes
a bottom surface portion,
a pair of end plate facing portions that face the respective end plates and that have a higher rigidity than the bottom surface portion,
a pair of side surface portions that extend in the stacking direction of the fuel cells of the cell stack, and
two pairs of mount portions, each pair being disposed near corner portions between the respective side surface portions and one of the pair of end plate facing portions and on outer walls of the respective side surface portions such that the mount portions in each pair are positioned across the bottom surface portion,
the two pairs of mount portions are formed so as to couple the pair of side surface portions to the respective pair of end plate facing portions,
the bottom surface portion has disposed thereon rib portions that project downward and that are each positioned at a distance from adjacent one of the pair of end plate facing portions in the stacking direction of the fuel cells of the cell stack such that the rib portions extend between the pair of mount portions that are positioned across the bottom surface portion, and
the fuel cells of the cell stack are stacked in a direction corresponding to a width direction of the vehicle.

* * * * *